Sept. 22, 1959   A. J. PETZINGER   2,905,901
ALTERNATING-CURRENT RESPONSIVE DEVICES
Filed March 14, 1955

WITNESSES:
E. A. McCluskey
David M. Schiller

INVENTOR
Ambrose J. Petzinger.
BY
C. L. Freedman
ATTORNEY

United States Patent Office 2,905,901
Patented Sept. 22, 1959

2,905,901

ALTERNATING-CURRENT RESPONSIVE DEVICES

Ambrose J. Petzinger, Fair Lawn, N.J., assignor to Westinghouse Electric Corporation, East Pittsburgh, Pa., a corporation of Pennsylvania Application March 14, 1955, Serial No. 494,012

2 Claims. (Cl. 324—138)

This invention relates to alternating-current responsive devices having magnetic structures and has particular relation to the formation of the magnetic structures of such devices.

The invention may be employed in connection with various types of electrical devices having magnetic structures. However, the invention is applied with particular advantage to integrating watthour meters of the induction type and will be described in connection with such meters.

Magnetic structures exhibit certain magnetic properties when energized in accordance with alternating quantities which depend to a substantial extent upon the formation of the structure. For example, magnetic structures exhibit magnetic permeability properties which are dependent upon the material employed in the structure. As a further example, energization of a magnetic structure in accordance with an alternating quantity is effective to produce magnetic hysteresis and eddy current losses in the structure which depend upon the material and dimensions of the magnetic structure. The performance characteristics of induction watthour meters depend to a substantial extent upon the magnetic properties exhibited by the magnetic structures employed in such meters.

Watthour meters have previously been constructed which include a magnetic structure having voltage and current magnetic parts. These magnetic parts include spaced portions defining an air gap in which a portion of an electroconductive armature is positioned. Windings surround the voltage and current parts to produce when energized alternating voltage and current magnetic fluxes which cooperate to establish a shifting magnetic field in the air gap. The armature is mounted for rotation under the influence of the magnetic field.

In accordance with the present invention, the magnetic properties of the voltage and current magnetic parts of a watthour meter are selected so as to provide certain desirable performance characteristics of the meter. The desired magnetic properties may be obtained by suitable selection of the materials, dimensions and formations of the voltage and current parts.

It is desirable that the voltage and current fluxes of a watthour meter have a predetermined phase relationship. At unity power factor of an associated circuit, this relationship should be such that the voltage and current fluxes are in quadrature. It has been observed that such phase relationship is dependent to a substantial extent upon the magnetic properties of the voltage and current magnetic parts.

According to the invention, the voltage and current magnetic parts of a watthour meter are constructed so as to exhibit predetermined magnetic properties for establishing a desired phase relationship between the voltage and current fluxes. Preferably, the phase relationship is controlled by forming the voltage and current parts so that the parts exhibit predetermined magnetic hysteresis and eddy current losses.

The desired magnetic losses may be provided in any suitable manner. According to a preferred embodiment of the invention, the magnetic materials of the voltage and current parts are selected to provide the desired magnetic losses. By forming the voltage and current parts of different magnetic materials, it has been observed that a desired phase relationship between the voltage and current fluxes may be obtained while maintaining the expense and efficiency of the meter at acceptable levels.

The voltage and current parts may be of solid or laminated construction. Preferably, the parts are of laminated construction with each part being formed of a separate plurality of laminations to facilitate the employment of different materials in the magnetic parts. The two parts may be joined in any suitable manner to provide a complete magnetic structure.

It is, therefore, an object of the invention to provide an improved induction watthour meter.

It is another object of the invention to provide a watthour meter including improved means for controlling the phase relationship between the voltage and current fluxes of the meter.

It is another object of the invention to provide a watthour meter including voltage and current magnetic parts constructed so as to exhibit predetermined magnetic properties for establishing a desired phase relationship between the voltage and current fluxes of the meter.

It is a further object of the invention to provide a watthour meter including voltage and current magnetic parts formed of different magnetic materials selected to establish a desired phase relationship between the voltage and current fluxes of the meter.

It is still another object of the invention to provide a watthour meter as defined in the preceding paragraph wherein the materials are selected to provide predetermined different magnetic loss properties of the voltage and current parts.

Other objects of the invention will be apparent from the following description, taken in conjunction with the accompanying drawings, in which.

Figure 1:
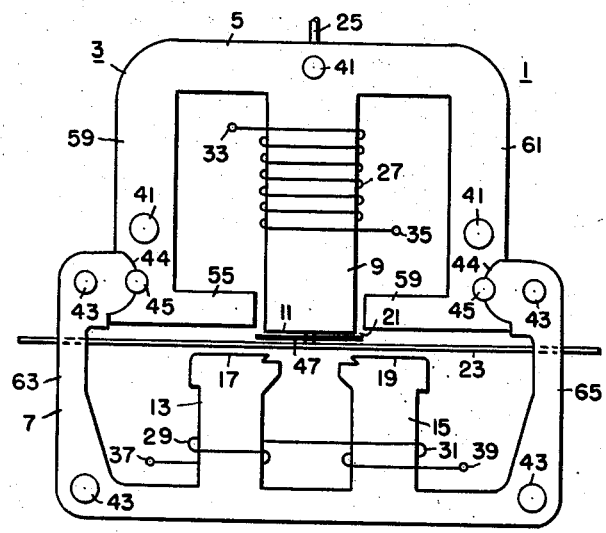
Figure 1 is a view in front elevation of a watthour meter embodying the invention.

Referring to the drawing, there is illustrated in Fig. 1 a watthour meter represented generally by the numeral 1 embodying the teachings of the invention. The invention, however, is applicable to various other electroresponsive devices such as electrical relays.

The meter 1 includes a magnetic structure 3 having a voltage magnetic driving element 5 and a current magnetic driving element 7. The voltage element 5 includes a voltage pole 9 having a pole face 11 and the current element 7 includes a pair of spaced current poles 13 and 15 having, respectively, pole faces 17 and 19. The pole faces 17 and 19 are disposed in a common plane which is spaced from and parallel to the plane of the voltage pole face 11 to define an air gap 21. An electroconductive armature in the form of a disc 23 is mounted for rotation through the air gap 21 by means of a shaft 25.

In order to establish a shifting magnetic field for influencing the disc 23, a voltage winding 27 surrounds the voltage pole 9 and current windings 29 and 31 surround the current poles 13 and 15. The winding 27 has a pair of terminals 33 and 35 adapted to be connected for energization in accordance with an alternating voltage to direct an alternating voltage flux through the air gap 21. The windings 29 and 31 are connected for series energization and are oppositely poled so that when the winding 29 directs a magnetomotive force in a downward direction in the pole 13, the winding 31 establishes an equal upwardly directed magnetomotive force in the pole 15. The windings 29 and 31 are provided with terminals 37 and 39 adapted to be connected for energization in accordance with an alternating current to direct an alternating current flux through the air gap 21 which cooperates with the voltage flux to establish a shifting magnetic field in the air gap for influencing the disc 23.

The parts of Fig. 1 which thus far have been specifically described are all well known and understood in the art. For this reason, an extended discussion of the parts thus far described is believed to be unnecessary.

In the past, watthour meters have been provided which include voltage and current magnetic driving elements of various formation. In accordance with the present invention, the voltage and current driving elements of a watthour meter are constructed so as to exhibit predetermined magnetic properties over the operating range of the meter. The magnetic properties exhibited by the elements 5 and 7 depend to a substantial extent upon the type of materials employed in the elements 5 and 7, and upon the formation and dimensions of the elements 5 and 7.

According to a preferred embodiment of the invention, the driving elements 5 and 7 are formed of different magnetic materials or different grades of the same magnetic material selected so that the elements 5 and 7 exhibit substantially different magnetic properties over the operating range of the meter. In order to facilitate the construction of the elements 5 and 7 of different magnetic materials or different grades of the same material, the elements 5 and 7 are conveniently of independent formation.

The elements 5 and 7 may be of either solid or laminated construction. Preferably, the elements 5 and 7 are of laminated construction with each element formed of a separate plurality of magnetic laminations of the desired material and configuration arranged so that the laminations extend parallel to the plane of the drawing.

In order to assemble the elements 5 and 7, the laminations of the separate elements are arranged in stacked formation to provide a pair of lamination stacks. The laminations of the separate stacks may be secured together in any desired manner. As illustrated in Fig. 1, the laminations of the element 5 are secured together at spaced points by suitable rivets or other fastening means 41. In a similar manner, the laminations of the element 7 are secured together at spaced points by rivets 43. The separate laminated elements 5 and 7 are provided with interfitting surfaces as indicated at 44 proportioned to form passages for the reception of suitable rivets 45 for the purpose of securing the elements 5 and 7 to each other to provide a rigid magnetic structure.

For a watthour meter, it is desirable that the voltage and current magnetic fluxes have a predetermined phase relationship. At unity power factor of an associated circuit, this phase relationship should be such that the fluxes are in quadrature. It has been observed that such phase relationship is dependent to a substantial extent upon the magnetic properties of the voltage and current driving elements.

It has been noticed that the phase displacement between the voltage energizing the voltage driving element and the voltage flux produced thereby is dependent to a substantial extent upon the magnetic permeability properties of the voltage driving element. It has been further observed that such phase displacement is for practical purposes independent of the magnetic hysteresis and eddy current losses of the voltage element. Furthermore, the phase displacement between the current energizing the current driving element and the resultant current flux has been observed to depend upon both the magnetic permeability properties and magnetic loss properties of the current element. This may be shown by consideration of Figs. 2 and 3.

Figure 2:
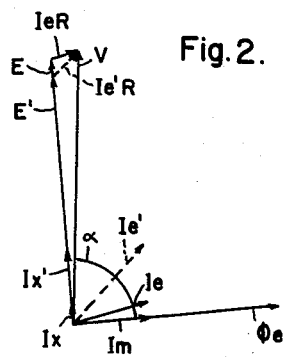
Figs. 2 and 3 are vector diagrams illustrating vector relationships between various electrical quantities associated with the meter of Fig. 1.

Referring now to Fig. 2, there is illustrated a vector diagram showing various vector relationships between electrical quantities associated with the voltage magnetic driving element 5. In Fig. 2, the voltage of an associated circuit (not shown) is represented by the vector V. Let it be assumed that the winding 27 is connected for energization through the terminals 33 and 35 in accordance with the voltage V. Then an exciting current represented by the vector $I_e$ is caused to flow through the winding 27.

It is observed with reference to Fig. 2 that the current $I_e$ lags behind the voltage V by substantially 90° by reason of the large number of turns of the winding 27. Inasmuch as the winding 27 is formed of an electroconductive material, such as copper, the winding 27 offers some resistance to the flow of current with the result that an exact quadrature relationship between the voltage V and the current $I_e$ is not realized.

As is understood in the art, the current $I_e$ is composed of two current components. One of these components is represented in Fig. 2 by the vector $I_x$ and is utilized to supply magnetic hysteresis and eddy current losses of the voltage element 5. The other of these components is represented by the vector $I_m$ and is employed to establish magnetic flux in the voltage element 5. The magnitude of the component $I_m$ is dependent upon the permeability properties of the element 5. The current $I_e$ is the vector sum of the components $I_x$ and $I_m$.

The flux established by the current component $I_m$ is represented by a vector $\phi_e$ and is in phase with the component $I_m$. It is also observed that the current component $I_x$ is in phase with the voltage induced in the winding 27 by the exciting current $I_e$ which is represented in Fig. 2 by the vector E and which leads the flux $\phi_e$ by 90°. The voltage V is the vector sum of the induced voltage E, the resistive voltage drop across the winding 27 and the reactive voltage drop across the winding 27. The resistive drop is represented by the vector $I_eR$ and is in phase with the exciting current $I_e$. For purposes of convenience the reactive drop is not represented in Fig. 2. During the following discussion the reactive drop produced by energization of the winding 27 will be considered negligible and will be disregarded.

It is noticed with reference to Fig. 2 that the voltage flux $\phi_e$ lags behind the voltage V by an angle $\alpha$ which is somewhat less than 90°. As will presently appear, the phase displacement between the voltage V and the voltage flux $\phi_e$ as represented by the angle $\alpha$ is for practical purposes independent of the magnitude of the magnetic losses exhibited by the voltage element 5. This may be explained by further consideration of Fig. 2.

For purposes of illustration, let it be assumed that the voltage element 5 for which a current component $I_x$ is required is replaced by a voltage element 5 exhibiting increased magnetic losses requiring a current component $I_{x'}$ of increased magnitude. Let it be further assumed for purposes of discussion that the magnitude of the current component $I_m$ required to establish magnetic flux in the element 5 remains unchanged. Then for such conditions, energization of the element 5 through the terminals 33 and 35 in accordance with the voltage V is effective to cause an exciting current represented by the dotted vector $I_{e'}$ to flow through the winding 27.

The current $I_{e'}$ is effective to produce a resistive voltage drop across the winding 27 which is represented by the dotted vector $I_{e'}R$ and which is in phase with the current $I_{e'}$. In addition, the current $I_{e'}$ induces a voltage in the winding 27 which is represented by the vector E'. The current component $I_{x'}$ is in phase with the induced voltage E'. The current $I_{e'}$ further causes a reactive voltage drop across the winding 27 which is not represented in Fig. 2 for purposes of convenience.

By reason of the increased magnitude of the component $I_{x'}$, the magnitude of the current $I_{e'}$ is greater than that of the current $I_e$, and the current $I_{e'}$ is displaced in phase from the current $I_e$. However, since the component $I_{x'}$ is in phase with the voltage E', and since the magnitude of the component $I_m$ is assumed to be unchanged for the present condition, the voltage E' is shown in phase with the voltage E. Consequently, the phase displacement between the voltage V and the flux $\phi_e$ is unchanged from the previous condition wherein a voltage element having magnetic losses requiring a component $I_x$ was employed. The magnitude of the voltage E' is somewhat less than the magnitude of the voltage E by reason of the resultant increase in magnitude and change in phase displacement of the resistive voltage drop $I_{e'}R$ relative to the resistive drop $I_eR$.

In practice, current energizing the winding 27 will produce a reactive voltage drop across the winding which is displaced 90° in phase relative to the resistive voltage drop caused by the energizing current. Consequently, a change in magnitude of the energizing current and in the phase relationship between the energizing current and the voltage V effected by a variation of the magnetic losses of the voltage element will alter the magnitude of the reactive drop and the phase relationship between the reactive drop and the voltage V.

Such magnitude and phase variations of the reactive drop will have some effect upon the phase relationship between the voltage V and the flux $\phi_e$. However, it has been observed that such effect is negligible and that for practical purposes the phase relationship between the voltage V and the flux $\phi_e$ may be considered independent of the magnitude of magnetic losses exhibited by the voltage element.

It may be shown in a similar manner that the phase displacement between the voltage V and the voltage flux $\phi_e$ is dependent to a substantial extent upon the magnitude of the current component $I_m$ and, consequently, upon the magnetic permeability properties of the voltage element 5.

Figure 3:
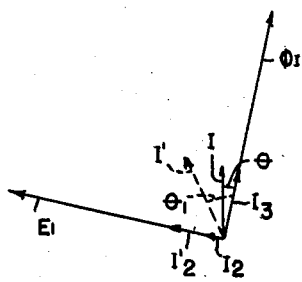

Referring now to Fig. 3, there is illustrated a vector diagram showing vector relationships between various electrical quantities associated with the current element 7. As there shown, the current flowing through an associated circuit (not shown) is represented by a vector I. Let it be assumed that the windings 29 and 31 are connected for series energization through the terminals 37 and 39 in accordance with the current I.

In present day meters, the current windings 29 and 31 consist of a relatively few turns of large cross section wire connected to carry either the entire line current or a current proportional to the line current of an associated circuit (not shown). Consequently, the vector I also represents the exciting current flowing through the windings 29 and 31. Such exciting current has two current components, one of which is represented by the vector $I_2$ and the other of which is represented by the vector $I_3$ in quadrature with the component $I_2$. The component $I_2$ supplies magnetic losses for the current element 7 and is shown in phase with the voltage induced in the windings 29 and 31 by the current I which is represented by the vector $E_1$. The component $I_3$ establishes the current magnetic flux of the element 7 which is represented by the vector $\phi_I$ and which is shown in phase with the component $I_3$. The magnitude of the component $I_3$ is dependent upon the magnetic permeability properties of the element 7.

It is observed with reference to Fig. 3 that the current flux $\phi_I$ lags behind the exciting current I by an angle $\theta$. The phase displacement between the flux $\phi_I$ and the current I as represented by the angle $\theta$ is caused by the presence of the current component $I_2$ required to supply magnetic losses of the element 7. As will presently appear, the magnitude of the angle $\theta$ varies substantially in accordance with the magnitude of the current component $I_2$ required to supply magnetic losses of the element 7.

Let it be assumed that the current element 7 requiring a current component $I_2$ is replaced by a current element 7 having increased magnetic losses requiring an increased current component $I'_2$ to supply such increased losses. Let it be assumed further that the magnitude of the component $I_3$ remains unchanged for purposes of illustration. Then inasmuch as the magnitude of the components $I'_2$ is somewhat greater than the magnitude of the component $I_2$, it follows that the magnitude of the exciting current I must also be increased. This increased exciting current is represented in Fig. 3 by the dotted vector I'.

Since the current I' is the vector sum of the components $I'_2$ and $I_3$, the current I' is displaced in phase from the flux $\phi_I$ by an angle $\theta_1$ which is observed to be substantially greater than the angle $\theta$. Consequently, it is shown that the phase displacement between the exciting current flowing through the windings 29 and 31 and the current flux produced thereby varies substantially in accordance with the magnitude of the current component required to supply magnetic losses of the current element 7.

It may be shown by a similar analysis that the phase displacement between the current in the windings 29 and 31 and the resultant current flux is also dependent upon the magnitude of the component $I_3$ and, consequently, upon the permeability properties of the current element 7.

For the purpose of controlling the phase relationship between the voltage and the current fluxes, conventional watt-hour meters have associated therewith an electroconductive flux lagging member for lagging one or both of the fluxes. Such a lagging member is represented in Fig. 1 by the numeral 47 and is positioned in the air gap 21 to lag the voltage flux.

The lagging effect produced by the member 47 may be varied either by physical adjustment of the member 47 relative to the voltage pole 9, or by adjustment of the electrical resistance of the member 47. In certain installations, it may be desirable to provide a predetermined range of adjustment of the member 47. For example, it may be desirable for certain reasons to provide a small range of adjustment of the member 47 sufficient for effecting the desired quadrature relationship of the voltage and current fluxes. This result may be achieved by establishing a phase displacement between the voltage and current fluxes prior to adjustment of the member 47 which deviates from a quadrature relationship by only a small amount.

In accordance with the invention the magnetic properties of the voltage and current elements 5 and 7 are selected to establish a predetermined phase relationship between the voltage and current magnetic fluxes. To this end the voltage and current elements 5 and 7 may be formed to exhibit predetermined magnetic permeability properties for establishing the desired phase relationship. Preferably, however, the magnetic hysteresis and eddy current losses of the element 7 are selected to provide the desired phase relationship between the fluxes. The desired magnetic losses of the element 7 may be obtained in any suitable manner. For example, the cross-sectional area of portions of the element 7 may be selected to provide desired hysteresis losses. As a further example, the thickness dimensions of the laminations of the element 7 may be selected to provide desired eddy current losses of the element 7.

According to a specific embodiment of the invention the desired magnetic losses of the element 7 are obtained by proper selection of the magnetic material employed in the element 7. By forming the elements 5 and 7 of different magnetic materials, it has been observed that a desired phase relationship between the voltage and current fluxes may be obtained while maintaining the efficiency and cost of the meter at acceptable levels.

According to one aspect of the invention the current element 7 is formed so as to exhibit low magnetic losses over the operating range of the meter to thereby provide a correspondingly small phase displacement between the current energizing the windings 29 and 31 and the resultant current flux as explained in connection with Fig. 3. With such arrangement a desired small adjustment of the lagging member 47 may be sufficient for establishing a quadrature relationship between the voltage and current fluxes.

To this end the current element 7 is conveniently formed of a plurality of laminations, each constructed of a magnetic material having a small coefficient of magnetic hysteresis and a high electrical resistivity. A number of low loss materials such as high-silicon steel and certain nickel-iron alloys are commercially available. For example, the element 7 may be formed of a plurality of laminations of 4% silicon steel having a coefficient of hysteresis of approximately .001 for use with c.g.s. units.

By proper selection of the thickness dimensions and the material of the laminations of the element 7, magnetic losses of the element 7 may be provided for establishing a phase displacement between the current energizing the windings 29 and 31 and the resulting current flux which is less than one angular degree. Such a small phase displacement permits utilization of a lagging member 47 having a correspondingly small range of adjustment for providing the desired quadrature relationship between the voltage and current fluxes.

Low loss materials such as high-silicon steels are relatively expensive as compared to materials exhibiting greater magnetic losses. According to a further aspect of the invention, the desired small deviation of the phase displacement between the fluxes from a quadrature condition may be achieved most economically by forming the voltage element 5 of a material having a relatively high coefficient of hysteresis as compared to the coefficient of the material of the element 7. It will be recalled that the magnitude of the magnetic losses of the voltage element 5 has substantially no effect upon the phase displacement between the voltage applied to the winding 27 and the voltage magnetic flux. As an example, the element 5 may be formed of a plurality of laminations constructed of soft iron having a coefficient of hysteresis of approximately .003 for use with c.g.s. units.

Figure 4:
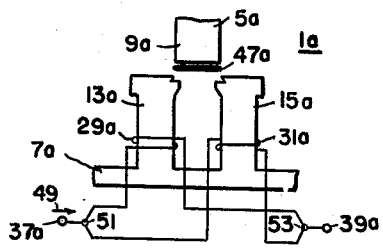
Fig. 4 is a view in front elevation with parts broken away of a watthour meter of different construction from the meter of Fig. 1.

The invention is also employed with advantage in connection with a meter of the type illustrated in Fig. 4 which is represented generally by the numeral 1a. The meter 1a differs from the meter 1 in the manner of energizing the current windings associated with the current magnetic poles. As shown in Fig. 4, the windings 29a and 31a are connected for parallel energization in accordance with current flowing in an associated circuit (not shown) rather than for series energization in the manner of Fig. 1.

To this end, a pair of parallel branches are provided with each branch including a separate one of the windings 29a and 31a. Current entering the terminal 37a and having an instantaneous direction of flow as represented by the arrow 49 divides between the parallel branches of the junction 51 with each portion of the current flowing through a separate one of the windings 29a and 31a to produce an alternating current flux. The currents flowing through the parallel branches then recombine at the junction 53 to leave the terminal 39a.

By inspection of Fig. 4, it is observed that a closed circuit loop is established between the junctions 51 and 53 which includes the windings 29a and 31a in series. This closed loop is positioned to surround the alternating voltage flux emanating from the voltage pole 9a. The voltage flux linking the closed loop induces electromotive forces in the loop which direct current around the loop to establish a flux which is displaced in time phase relative to the voltage flux. Such established flux cooperates with the voltage flux to produce a resultant flux which is nearer to the desired quadrature relationship with respect to the current flux than the voltage flux. Consequently, the action of the closed loop is observed to be identical to the action of the lagging member 47 of Fig. 1.

The meter 1a is provided with a flux lagging member 47a which is similar to the member 47 of the meter 1. By reason of the closed loop established by the parallel connection of the windings 29a and 31a, the amount of adjustment of the member 47a required to establish the desired quadrature relationship between the voltage and current fluxes is considerably less than if the loop were omitted. For certain purposes, it may be desirable to provide a substantial range of adjustment of the lagging member 47a.

In accordance with the invention, this desirable result is achieved by constructing the current element 7a so that the element 7a exhibits high magnetic losses over the operating range of the meter 1a. This is effective to establish a correspondingly large phase displacement between the current energizing the windings 29a and 31a and the current flux to thereby establish a phase displacement between the voltage and current fluxes which deviates from a quadrature condition by a correspondingly large amount.

The element 7a may be proportioned to exhibit high magnetic losses to achieve the desired result in any suitable manner. According to a specific embodiment of the invention, the current element 7a is formed of a plurality of laminations, each constructed of a material selected to exhibit a high coefficient of magnetic hysteresis. For example, the laminations of the element 7a may be formed of soft iron.

By proper selection of the thickness dimensions and the material of the laminations of the element 7a, magnetic losses of the element 7a may be provided for establishing a phase displacement between the current energizing the windings 29a and 31a and the resulting current flux which is within the range of three to four angular degrees. Such a phase displacement permits the employment of a lagging member 47a having a substantial range of adjustment notwithstanding the presence of the auxiliary lagging effect produced by the closed loop defined by the windings 29a and 31a.

It is observed with reference to Fig. 1 that voltage flux produced by energization of the winding 27 will traverse a number of paths. A substantial portion of the voltage flux emanating from the pole 9 will flow through the magnetic arms 55 and 57 in parallel to return to the pole 9 through portions 59 and 61 of the element 5. The remaining portion of the voltage flux, however, will traverse the disc 23 and the air gap 21 to enter the current poles 13 and 15 of the element 7. The remaining flux portion then returns to the pole 9 through portions 59, 61, 63 and 65 of the structure 3. This remaining flux portion will have some effect upon the magnetic properties of the element 7 which should be taken into account when constructing a meter in accordance with the invention.

In order to maintain the resultant magnetic losses of the voltage and current elements 5a and 7a within acceptable limits, the invention provides that the voltage element 5a be formed so as to exhibit relatively low magnetic losses as compared to the losses of the current element 7a over the operating range of the meter. According to a specific embodiment of the invention, the laminations of the element 5a are constructed of a magnetic material having a coefficient of magnetic hysteresis less than the coefficient of the material used in the element 7a. For example, the laminations of the element 5a may be formed of 4% silicon steel.

The invention is employed with advantage in times of material shortages. Since the phase displacement between the voltage and current fluxes is dependent upon the magnetic losses exhibited by the current magnetic element, a desired magnetic material may be conserved for use in the current element and a readily available material may be employed in the voltage magnetic element, Since numerous changes may be made in the above described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In an alternating current watthour meter, a magnetic structure including voltage and current magnetic parts, said magnetic parts including spaced portions defining an air gap, voltage winding means for the voltage part effective when energized to direct an alternating voltage magnetic flux through the voltage part and the air gap into the current part, current winding means for the current part effective when energized to direct an alternating current magnetic flux through the current part and the air gap cooperating with the voltage flux to establish a shifting magnetic field in the air gap, armature means mounted for rotation through the air gap under the influence of the shifting field, and a flux lagging member positioned in the path of one of the fluxes, said lagging member being adapted for adjustment to establish a predetermined phase relationship between the fluxes, said voltage part being formed entirely of a plurality of first laminations each constructed of a first magnetic material, said current part being formed entirely of a plurality of second laminations each constructed of a second magnetic material, said first and second materials having different compositions selected to exhibit predetermined different coefficients of magnetic hysteresis such that the coefficient of said first material is less than the coefficient of said second material.

2. In an alternating current watthour meter, a magnetic structure including voltage and current magnetic parts effective in response to the conduction of alternating flux to exhibit magnetic hysteresis and eddy current losses, said voltage and current magnetic parts including spaced portions defining an air gap, voltage winding means for the voltage part effective when energized in accordance with an alternating voltage to produce an alternating voltage flux, current winding means for the current part effective when energized in accordance with an alternating current to produce an alternating current flux cooperating with the voltage flux to establish a shifting magnetic field in the air gap, armature means mounted for rotation through the air gap under the influence of the magnetic field, and a flux lagging member positioned in the path of the voltage flux to lag the voltage flux, said lagging member being adapted for adjustment to establish a predetermined phase relationship between the voltage and current fluxes, said phase relationship being dependent upon the magnetic losses exhibited by the current part, and being substantially independent of the magnetic losses exhibited by the voltage part, said current part being formed to exhibit predetermined magnetic losses for establishing a predetermined phase relationship between the voltage and current fluxes to thereby permit a predetermined adjustment of the flux lagging member, said voltage part being formed to exhibit less magnetic losses than the current part over the operating range of the meter.

References Cited in the file of this patent

UNITED STATES PATENTS

| | | |
|---|---|---|
| 895,100 | Morck | Aug. 4, 1908 |
| 1,942,164 | Frohlich | Jan. 2, 1934 |
| 1,982,344 | Kinnard | Nov. 27, 1934 |
| 2,229,072 | Green | Jan. 21, 1941 |

FOREIGN PATENTS

| | | |
|---|---|---|
| 12,250 | Great Britain | June 5, 1908 |